United States Patent
Los

[15] 3,681,407
[45] Aug. 1, 1972

[54] 3-METHOXY-8β-METHYLESTRA 1,3,5(10),9(11)-TETRAENE-17β-CARBOXYLIC ACID LOWER ALKYL ESTER AND INTERMEDIATES IN THE PREPARATION THEREOF

[72] Inventor: Marinus Los, Trenton, N.J.

[73] Assignee: American Cyanamid Company, Stamford, Conn.

[22] Filed: June 18, 1969

[21] Appl. No.: 834,493

[52] U.S. Cl.....260/397.1, 260/239.55 C, 260/397.3, 260/397.45, 260/590, 424/243

[51] Int. Cl............................................C07c 169/24

[58] Field of Search.......260/239.55 C, 397.1, 397.3, 260/397.45

[56] References Cited
UNITED STATES PATENTS

| | | | |
|---|---|---|---|
| 3,248,407 | 4/1966 | Alvarez | 260/397.4 |
| 3,318,789 | 5/1967 | Degers et al. | 204/158 |
| 3,375,260 | 3/1968 | Bowers et al. | 260/397.3 |
| 3,417,105 | 12/1968 | Hughes et al. | 260/340.9 |
| 3,400,123 | 9/1968 | Nagata et al. | 260/239.55 |

*Primary Examiner*—Elbert L. Roberts
*Attorney*—Ernest Y. Miller

[57] ABSTRACT

This invention relates to novel steroid and steroid-like compounds, a method for synthesizing said compounds and to the use thereof as progestational agents in the treatment of laboratory and domestic animals. Certain of said compounds are also useful as estrogenic agents.

4 Claims, No Drawings

3-METHOXY[β-METHYLESTRA 1,3,5(10),9(11)-TETRAENE-17β-CARBOXYLIC ACID LOWER ALKYL ESTER AND INTERMEDIATES IN THE PREPARATION THEREOF

My copending application Ser. No. 708,498, filed Feb. 27, 1968, now U.S. Pat. No. 3,565,958 describes and claims starting materials of the present invention.

DESCRIPTION OF THE INVENTION

The present invention relates to novel steroid-like compounds having a formula selected from the group consisting of:

(A)

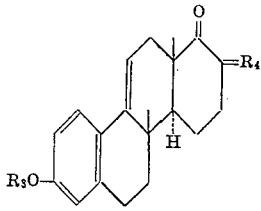

wherein $R_3$ is a lower alkyl radical of from one to four carbon atoms and $R_4$ is a member selected from the group consisting of $H_2$, CHOH and $N_2$;

(B)

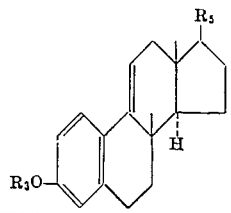

wherein $R_3$ is as described above and $R_5$ is a member selected from the group consisting of COOH, COO-loweralkyl, $COCH_2SOCH_3$ and $COCH_3$, (C)

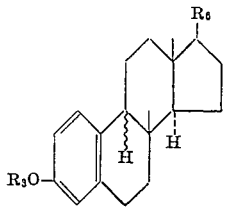

wherein $R_3$ is as described above and $R_6$ is a member selected from the group consisting of —$COCH_3$ group and

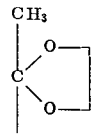

(D)

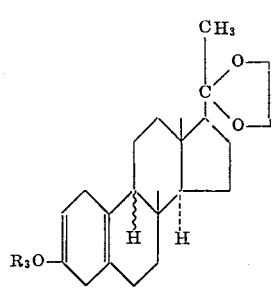

wherein $R_3$ is as described above; and (E)

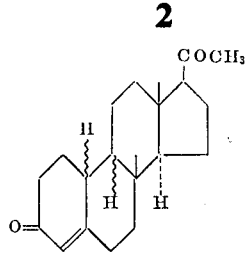

This invention also relates to a method for synthesizing the above-identified novel compounds and to the use of such compounds as progestational agents and intermediates for the preparation of progestational agents particularly useful in the treatment of domestic and laboratory animals. Certain of said compounds are also useful as estrogenic agents.

PREFERRED EMBODIMENT OF THE INVENTION

The compounds of the present invention can be synthesized from the starting materials identified by Formulas (I) and (IV) on the Synthesis Diagram, sheet 1, hereinafter. In these formulas and those proceeding from said starting materials and graphically illustrated on Synthesis Diagram, sheets 1 and 4, R is a member selected from the group consisting of t-butoxy (—O—C—$(CH_3)_3$,), ethylenedioxy

and tetrahydropyranyloxy

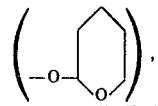

$R_1$ is hydrogen or lower alkyl, such as methyl, ethyl, propyl, isopropyl or butyl and $R_2$ is oxygen or hydroxyl.

Briefly, the enedione having the formula

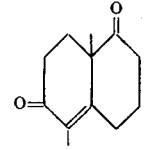

can be converted to the Formula (IV) compound wherein R is ethylenedioxy by treatment thereof with excess ethylene glycol and p-toluenesulfonic acid in an inert solvent, such as, benzene at an elecated temperature. Reaction of the thus formed monoketal with ethylformate and an alkali metal methoxide gives the hydroxymethyl-ene ketone which, when treated with N-methylaniline yields the Formula (I) compound wherein R is ethylenedioxy.

Treatment of the above-identified enedione with an alkali metal borohydride in the presence of a lower alkanol gives the naphthalenone corresponding to Formula (IV) wherein R is hydroxyl. The alcohol is then dissolved in methylene chloride and the solution treated with isobutylene in the presence of an acid catalyst to obtain the Formula (IV) compound wherein R is t-butoxy. The corresponding tetrahydropyranyloxy compound is made from the alcohol by dissolving the same in tetrahydrofuran and treating the solution with dihydropyran containing phosphorus oxychloride.

Preparation of Formula (I) compounds wherein R is t-butoxy or tetrahydropyranyloxy is then achieved in the same manner as described above for the Formula (I) compound in which R is ethylenedioxy. This involves preparation of the formyl compound and treatment thereof with N-methylaniline.

The allyl compounds (II) are obtained by alkylation of the N-methylanilinomethylene compound (I) with an allyl halide such as allyl bromide. Hydrolysis of (II) under strongly basic conditions then gives the desired unblocked ketone (III) which, when ozonized, yields by selective cleavage of the allyl double bond the corresponding aldehyde (VI). The unblocked ketone (III) can also be obtained directly from the enone (IV) by treatment of (IV) with a strong base such as potassium t-butoxide or sodium hydride in an inert solvent, such as, t-butanol or dimethoxyethane followed by allyl bromide at an elevated temperature. Reaction of the thus formed product (III) in tetrahydrofuran with an alkali metal chlorate and osmium tetroxide gives the hemiketal (V) which is converted to the aldehyde (VI) by reaction with an alkali metal periodate and further treatment of the aldehyde (VI) with m-methoxyphenyl magnesium bromide gives the hemiketal (VII, $R_1 = H$) in good yield.

The hemiketal (VII) is also perpared from the starting material (I) by the route involving reaction of the anion of (I) with m-methoxyphenacyl bromide, preferably at about 0°C. to obtain the anilino compound (VIII) which, on hydrolysis in strong base gives the unblocked ketone (X). The reaction is preferably run at an elevated temperature in a lower alkylene glycol. If the reaction is terminated after a short period of reflux about 1 to 3 hours, a major portion of the product obtained will be the formyl compound (IX), however, if the reaction is run for approximately 6 hours, the unblocked ketone (X) is obtained in high yield. Reduction of this latter compound with hydrogen in acetic acid and a catalyst such as palladium gives the ketone (XI). The reaction is preferably run at an elevated temperature between about 50°C. and 90°C. and at a super atmospheric pressure. Acid hydrolysis of the thus formed product (XI) yields the diketone or ketoalcohol (XV). The ketone (XI) may also be obtained from the hemiketal (VII) by reduction of the same with hydrogen and a palladium catalyst in acetic acid. In addition to the previous route described for the preparation of (VII), such product can be obtained by catalytic reduction of the diketone (X). When this product

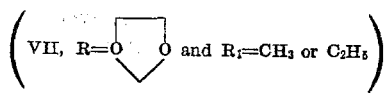

is then hydrolyzed with aqueous acetic acid at an elevated temperature the hemiketal (XII) is formed. When (VII, R=t-butoxy or tetrahydropyranyloxy and $R_1$=H, methyl or ethyl) is hydrolyzed by mineral acid, then (XVI) is the product. When the compound (XII) is then subject to treatment with hot acetic acid-acetic anhydride mixture the diketone (XIII) is formed. This product is also obtained when (VII, R=ethylenedioxy and $R_1$ is H or methyl) is treated with acetic acid and acetic anhydride giving the acetoxyketone which is hydrolyzed to the diketone (XIII) in aqueous acetic acid. Conversion of the diketone (XIII) to the trans-styrene (XIV) is accomplished by reaction thereof with a strong acid such as p-toluene sulfonic acid at an elevated temperature in an inert solvent. Hydrogenation of the trans-styrene (XIV) yields the enedione (XV, $R_2$=oxygen) identical with that formed by acid hydrolysis of XI, (R=ethylenedioxy). When the hemiketal (XVI) is reduced with hydrogen in the presence of a catalyst (XV, $R_2$=hydroxyl) is obtained.

The enedione (XV, $R_2$=oxygen) is then reduced with sodium borohydride to the unsaturated keto alcohol (XVII). Further reduction of (XVII) with hydrogen in the presence of a palladium catalyst yields the keto alcohol (XVIII) which is readily oxidized to trans-dione (XIX) by mild oxidation with Jones' reagent. Cyclization of (XIX) by mineral acid at an elevated temperature gives the D-homo steroid (XX).

While synthesis diagram sheets I, II, and III and the above description refers primarily to the preparation of methoxy substituted compounds, for example, the 3-methoxy-D-homosteroid (XX) it is, of course, recognized that other lower alkoxy homologues ($C_1$-$C_4$) of the above compounds can be prepared using the appropriate starting materials. Employing m-lower alkoxyphenyl-magnesium bromide or m-lower alkoxyphenacyl bromides in the syntheses shown on Synthesis Diagram, Sheet I, leads to the corresponding lower alkoxy derivatives of VII and VIII. Synthesis Diagram (IV), which is directed to compounds of the present invention and the synthesis route employed, therefore shows the 3-position substituted by a lower alkoxy group ($R_3$).

The D-homosteroid (XX) may be converted to the formyl-ketone (XXI) by reaction with a lower alkyl formate ($C_1$-$C_4$) in the presence of a base such as an alkali metal lower alkoxide ($C_1$-$C_4$) or alkali metal hydride. Preferred bases include the sodium and potassium t-butoxides and hydrides. The reaction is preferably carried out in the presence of an inert organic solvent such as a lower alkyl ether or a monocyclic hydrocarbon. Benzene and toluene are particularly useful but solvents such as xylene, ethyl ether, methylether ether and the like may also be used. The reaction is conveniently conducted at a temperature between about 0°C. and 30°C. but somewhat higher or lower temperatures may be used. Treatment of the formylketone (XXI) with tosyl azide in the presence of a diloweralkylamine such as dimethyl or diethyl amine, at a temperature between about 0° and 50°C., then yields the diazoketone (XXII).

Photolysis of (XXII) in a lower alkyl alcohol such as methanol, ethanol, butanol or the like results in a substantial yield, i.e., of the order of 75 percent, of the ring contracted ester (XXIII). Photolysis of (XXII) in aqueous tetrahydrofuran or an ether miscible with water, such as dimethoxyethane, gives the acid (XXIV) corresponding to the ester (XXIII). A by product from the photolysis of (XXII) in lower alcohol is found by NMR to contain an extra alkoxyl group. That this material results from the photo addition of lower alcohol to the styrene double bond is readily demonstrated by treating the by product with p-toluenesulfonic acid in benzene to give more of the ester (XXIII).

An extremely efficient process for the conversion of an ester to a lower alkyl ketone involves displacement of the ester by the carbanion of dimethylsulfoxide, prepared from dimethyl sulfoxide and sodium hydride, potassium t-butoxide or sodamide. This reaction gives a β-ketosulfoxide which is reductively cleaved by aluminum amalgam or zinc in acetic acid to the alkylketone. This procedure is applied to the ester (XXIII) to give the β-ketosulfoxide (XXV) which in turn is reduced to the lower alkyl ketone (XXVI). It should be noted that the β-ketosulfoxide (XXV) is obtained as a diasterioisomeric mixture.

The reduction of (XXVI) using a lower alkylalcohol or acetic acid and a palladium catalyst is stereospecific as determined by NMR. The carbonyl group of (XXVII) is protected as its ethylene ketal (XXVIII) which is then reduced with an alkali metal in liquid ammonia to the dihydrobenzene (XXIX). Finally, hydrolysis (XXIX) by a strong organic or inorganic acid such as aqueous acetic, p-toluene sulfonic, perchloric, hydrohalide or sulfuric acid, in an organic solvent such as a lower alkyl alcohol, tetrahydrofuran or the like, yields the desired product (XXX). This latter reaction is preferably carried out at a temperature between about 0°C. and 100°C. It has been found that compounds of the present invention have substantial progestational or estrogenic activity in domestic and laboratory animals including rabbits, rats, guinea pigs, sheep and swine.

Advantageously, these compounds may be administered by injection, in the feed or as tablets, pills, capsules, emulsions, liquids, suspensions or the like. Such compositions are generally prepared by dispersing the active ingredient in a conventional pharmaceutically acceptable carrier.

In the treatment of the smaller animals generally about 0.25 to 10 mg. and preferably 0.50 to 10 mg./head/day of the active compound is effective in obtaining an estrogenic or progestational response in said animals.

The reactions described above are shown graphically in the following Synthesis Diagram Sheets I to IV.

SYNTHESIS DIAGRAM
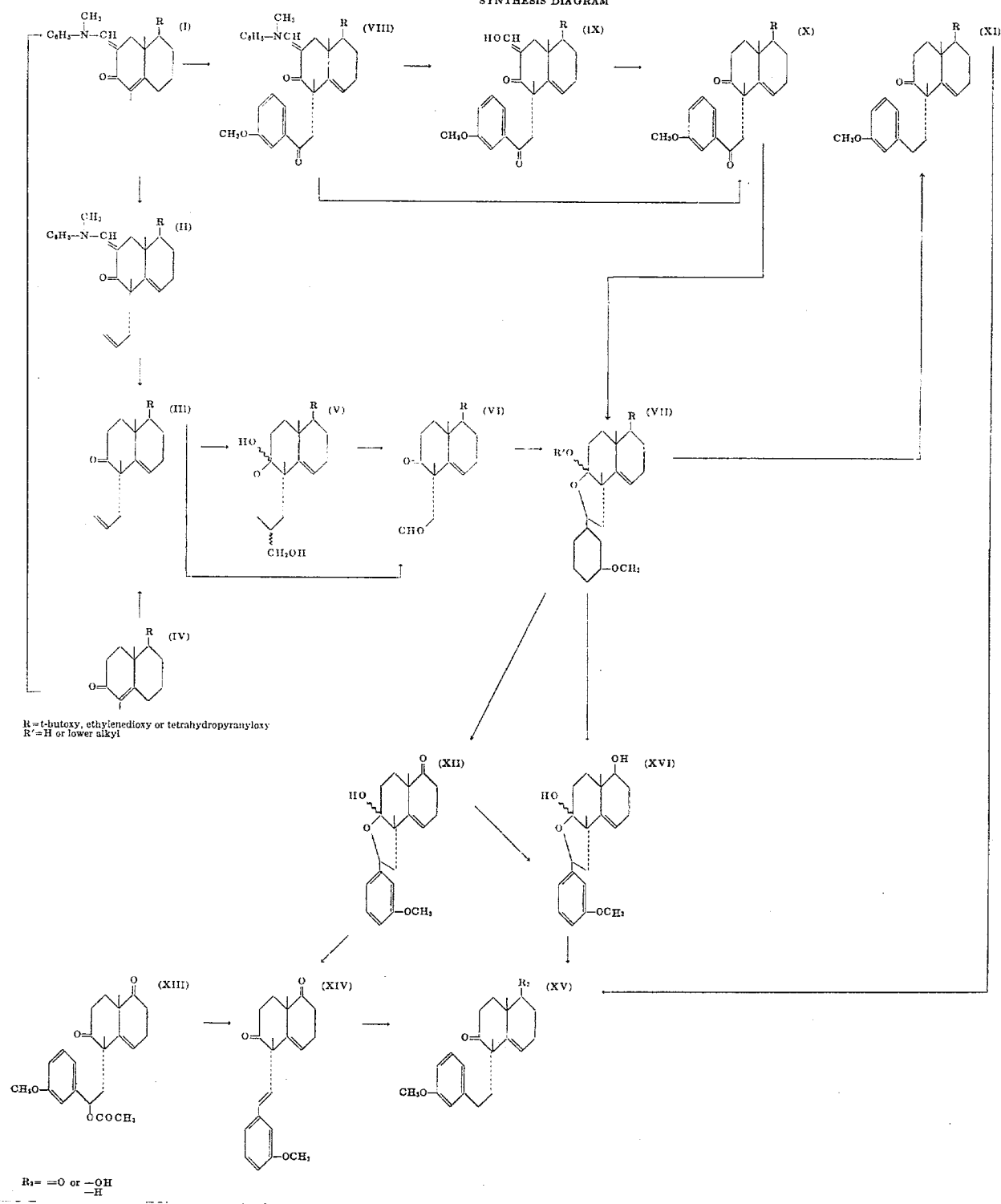

9
XV where
R₂=O
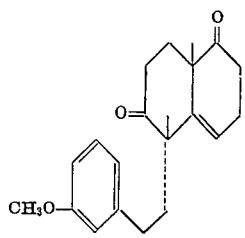
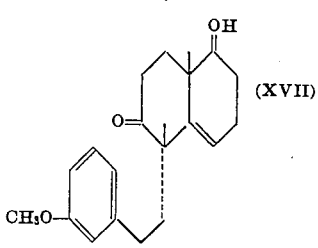 (XVII)
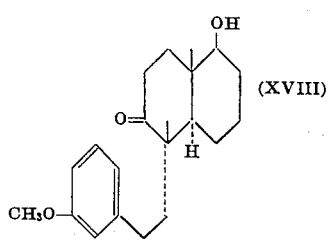 (XVIII)
10
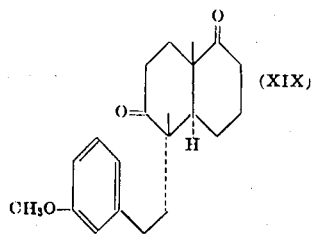 (XIX)
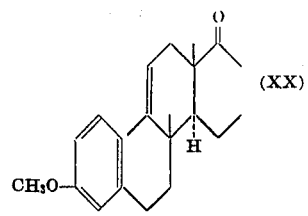 (XX)
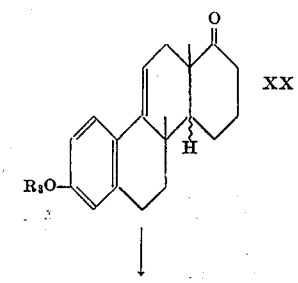 XX
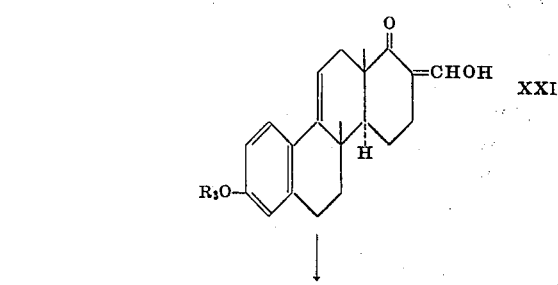 XXI
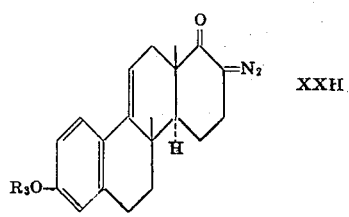 XXII
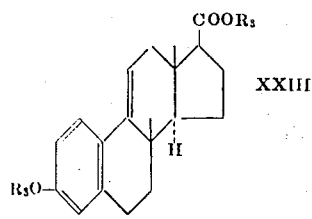 XXIII
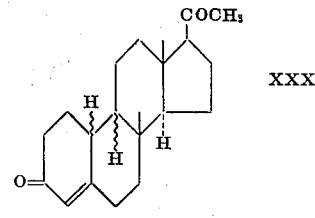 XXX
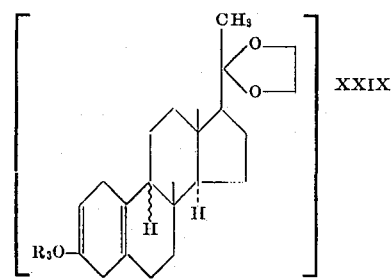 XXIX

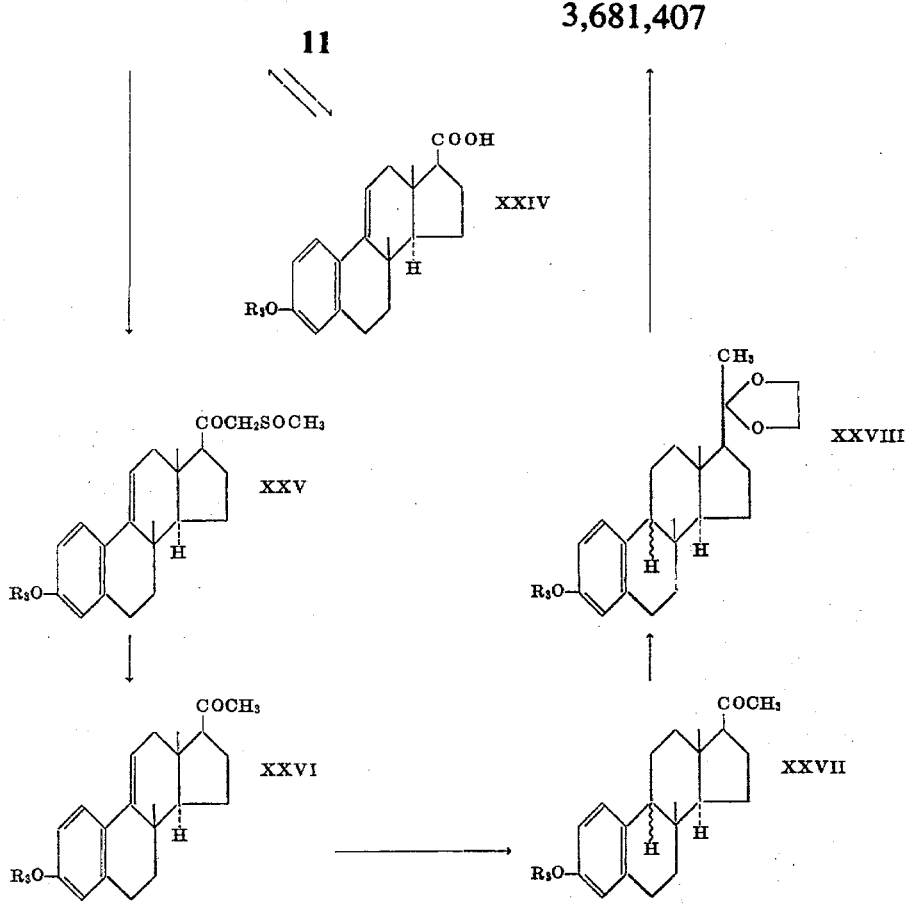

The process illustrated in Synthesis Diagrams, Sheets I, II, and III is described and claimed in my copending application Ser. No. 708,498, filed Feb. 27, 1968. The Examples 1 through 30 of said application describe in detail said process and products, and are incorporated herein.

SPECIFIC DISCLOSURE

The following examples describe in detail the preparation of starting materials and representative compounds of this invention and testing for estrogenic activity and estrous regulation.

EXAMPLE 1

Preparation of 4,4a,5,6,7,8-Hexahydro-5β-hydroxy-1,4aβ-dimethyl-2(3H)naphthalenone (IV-R=hydroxyl)

A solution containing 58.4 g. (0.304 mole) endione in 500 ml. absolute ethanol is cooled to 0° with stirring. Then 1.3 sodium borohydride is added to the solution and at 15-minute intervals, two more portions of 1.3 g. sodium borohydride is added. Fifteen minutes after the final addition, the solution is acidified with acetic acid and then the solvents evaporated. The residue is dissolved in chloroform, the organic phase washed with water, saturated sodium bicarbonate solution, dried and evaporated. The residue is distilled and recrystallized from ether-hexane and has melting point 79°–80° C. Calcd. for $C_{12}H_{18}O_2$: C, 74.19; H, 9.34. Found: C, 74.17; H, 9.24.

EXAMPLE 2

Preparation of 5β-tert-Butoxy-4,4a,5,6,7,8-hexahydro-1,4aβ-dimeth-yl-2(3H)naphthalenone (IV-R=tertiarybutoxy)

To a solution containing 4.0 g. (0.0206 mole) of the alcohol of Example 1 in 20 ml. dry methylene chloride at −20°C. in a pressure bottle is added approximately 20 ml. liquid isobutylene. Then 0.5 ml. catalyst (100 percent phosphoric acid saturated with boron trifluoride) is added, the pressure bottle closed and the mixture shaken at room temperature overnight. The bottle is cooled to −20°C. opened and a stream of dry nitrogen passed through the solution to remove excess isobutylene. The residue is diluted with methylene chloride and washed thoroughly with a saturated sodium bicarbonate solution. The aqueous phase is re-extracted with methylene chloride and the combined organic phase dried and evaporated. The products from a total of four such experiments were combined to give 24.1 g. oil. This is dissolved hexane and passed through a short column of neutral alumina. After evaporation of the solvent, the residue weighs 20.85 g. The t-butyl ether has boiling point 120°–122°C. at 0.3 mm., $N_D^{25} 1.5073$.

EXAMPLE 3

Preparation of 4,4a,5,6,7,8-Hexahydro-1,4aβ-dimethyl-5β-[(tetrahydropyran-2-yl)-oxy]-2(3H)naphthalenone (IV-R=tetrahydropyranyl-oxy To a solution containing 1.94 g. (0.01 mole) of the alcohol (prepared in Example 1) in 10 ml. dry tetrahydrofuran is added 2.5 ml. of pure dihydropyran followed by 2 drops of phosphorus oxychloride. After standing at room temperature for 4 hours, the solution is poured into saturated sodium bicarbonate solution, extracted with ether and the ether extract dried and evaporated. The residue consists of essentially pure tetrahydropyranyl ether. The infrared spectrum shows no residual hydroxyl group. Other strong acid catalysts such as hydrochloric, sulfuric and p-toluene-sulfonic acid may replace the phosphorus oxychloride.

EXAMPLE 4

Preparation of 3',4',8',8'a-Tetrahydro-5',8'a-dimethyl-spiro[1,3-dioxolane-2,1'(2H)-naphthalen]-6'(7'H)-one (IV-R=ethylenedioxy)

To a mixture of 6 g. (3.13 mmoles) enedione, (IV, R=O), 10 ml. ethylene glycol in 180 ml. benzene is added 100 mg. p-toluenesulfonic acid. The solution is heated at reflux under a water separator for 2¼ hours. The cold solution is diluted with ether and washed with sodium bicarbonate solution, water and saturated brine. The residue is filtered through a plug of alumina in benzene and the solvent evaporated. Crystallization of the residue from hexane at 0° gives 4.6 g. ketal (62.5 percent), melting point 53°–55°C.

EXAMPLE 5

Preparation of 3',4',8',8a-Tetrahydro-7'-(hydroxymethylene)5',8a-dimethyl-spiro[1,3-dioxolane-2,1'(2']-6'-(7'H)-one In a 5-liter three-necked flask equipped with stirrer, dropping funnel and nitrogen inlet, there is placed 100 g. (1.85 moles) sodium methoxide, 1,700 ml. benzene and through the dropping funnel, 265 ml. ethyl formate. After cooling in an ice-water bath, 127.4 g. (0.539 mole) ketal (prepared in Example 4) in 640 ml. benzene is added at 0° and stirred overnight at room temperature. The mixture is cooled to 0° and 500 ml. of 2.5M sodium dihydrogen phosphate solution added. A further 500 ml. phosphate solution, 500 ml. water and 500 ml. benzene is added and the aqueous phase separated. The organic phase is washed with water, dried and evaporated. The residue weighs 143 g. and has the above structure.

EXAMPLE 6

Preparation of 5β-tert-Butoxy-4,4a,5,6,7,8-hexahydro-3-(hydroxy-methoxymethylene)-1,4aβ-dimethyl-2(3H)-naphthalenone In a flask equipped with stirrer, thermometer and dropping funnel with nitrogen inlet is placed 111 g. (2.06 mole) of sodium methoxide and 1,900 ml. dry benzene. A nitrogen atmosphere is maintained throughout the reaction. Through the dropping funnel is then added 300 ml. ethyl formate in a stream. The mixture is cooled to 12°C. and 150.5 g. (0.6 mole) of crude t-butyl ether (prepared in Example 2) in 700 ml. dry benzene is added dropwise and the mixture stirred overnight. The organic phase is then extracted with water and 2N sodium hydroxide. The aqueous phases are acidified with 2.5M sodium dihydrogen phosphate and extracted with ether. The ether extract is washed with water, dried and evaporated to give 164.2 g. of oil. The formyl compound is crystallized from n-propanol and has melting point 76°–77°C. Calcd. for $C_{17}H_{26}O_3$: C, 73.34; H, 9.41 Found: C, 73.26; H, 9.42.

EXAMPLE 7

Preparation of 5β-tert-Butoxy-4,4a,5,6,7,8-hexahydro-1,4aβ-dimeth-yl-3-(N-methylanilinomethylene)-2(3H)-naphthalenone (I-R=t-butoxy To a solution containing 2.78 g. (10 mmoles) of the formyl compound (prepared in Example 6) in 10 ml. methanol is added 1.17 g. (11 mmoles) N-methylaniline. The mixture is warmed slightly and then allowed to stand at room temperature overnight. The solvent and excess aniline are removed under reduced pressure to leave 3.5 g. or orange-yellow oil. This material is crystallized from nitromethane and has melting point 77.5°–79°C.

EXAMPLE 8

Preparation of 3',4',8',8'a-Tetrahydro-5',8'a-dimethyl-7'-(N-methylanilinomethylene)-spiro[1,3-dioxolane-2,1'(2'H)-naphthalen]-6'-(7'H)-one The formyl compound (prepared in Example 5) is dissolved in 900 ml. methanol and 296 ml. (293.2 g., 2.74 moles) of N-methylaniline added. After standing at room temperature, the crystalline product separates and is removed by filtration and washed with hexane. The solvents are removed under reduced pressure and finally high vacuum to remove excess N-methylaniline. The residue is triturated with 100 ml. methanol and the crystalline product removed by filtration. The combined crystalline product weighs 165.35 g., melting point 152°–153°C.

EXAMPLE 9

Preparation of 5'α-allyl-3',7',8',8'a-Tetrahydro-5'β,8'aβ-dimethyl-7'-(N-methylanilinomethylene)-spiro[1,3-dioxolane-2,1'(2'H)-naphthalen]-6(5'H)-one (II R=ethylenedioxy)

To a stirred solution of 3.53 g. (0.01 mole) of material (prepared in Example 8) in 125 ml. dry t-butanol under nitrogen is added 5.6 g. potassium t-butoxide. The solution is heated under reflux for 30 minutes. The mixture is cooled to room temperature and 6.05 g. (0.05 mole) redistilled allyl bromide added dropwise. The solution is then heated under reflux for 1 hour. After cooling, the solution is poured into water, acidified with 2.5M sodium dihydrogen phosphate and extracted with ether. The extract is washed with water, dried and the solvent removed under reduced pressure to give the crude product (4.35 g.). Crystallization from absolute ethanol gives 2.24 g. (57%) of desired product, melting point 147.5°–149.5°C. Calcd. for $C_{25}H_{31}ON$: C, 76.30; H, 7.94; N, 3.56 Found: C, 75.98; H, 7.81, N, 3.83.

EXAMPLE 10

Preparation of 5'α-Allyl-3',7',8',8'a-Tetrahydro-5'β,8'aβ-dimethyl-spiro[1,3-dioxolane-2,1'(2'H)-naphthalen]-6'(5'H)-one (III R=ethylenedioxy)

A mixture containing 30.65 g. (0.078 mole) aniline compound, (prepared in Example 9) in 160 ml. 2-ethoxyethanol and 160 ml. water containing 35.0 g. potassium hydroxide is heated at reflux under nitrogen for 4 hours. The mixture is cooled, diluted with water and extracted with ether. The organic phase is washed successively with water, dilute hydrochloric acid, water and brine, dried and evaporated. The residue is crystallized from hexane to give the product melting point 67.5°–68.5°C. Calcd. for $C_{17}H_{24}O_3$: C, 73.88; H, 8.75 Found: C, 73.73; H, 8.64.

EXAMPLE 11

Preparation of 5′α-allyl-3′,7′,8′,8′a-Tetrahydro-5′β,8′aβ-dimethyl-spiro[1,3-dioxolane-2,1′(2′H)-naphthalen]-6′(5′H)-one (III R=ethylenedioxy To a solution containing 47.0 g. enone (prepared in Example 4) in 500 ml. dry t-butanol is added under nitrogen with stirring 56 g. potassium t-butoxide. The mixture is heated under reflux for 2 hours. The solution is cooled to room temperature and 29 g. allyl bromide is added dropwise. After stirring a further one-half hour at room temperature, the mixture is poured into water and extracted twice with ether. The ether extract is washed twice with water, dried and evaporated. The residue is crystallized from hexane to give 30.9 g. allyl compound identical with that formed in Example 10.

When the starting material contains the t-butoxy or tetrahydropyranyloxy group instead of ethylenedioxy, the corresponding t-butoxy and tetrahydropyranyloxy products are obtained.

EXAMPLE 12

Preparation of 2′,3′a,4′,5′,5′a,7′,8′,9′b-Octahydro-3′a-hydroxy-5′aβ,9′bβ-dimethyl-spiro[1,3-dioxolane-2,6′(1′H)-naphtho[2,1-b]-furan]-2′-methanol (V R=ethylenedioxy)

To a solution containing 27.6 g. of the allyl compound (prepared in Example 10), in 450 ml. tetrahydrofuran is added a solution containing 12.8 g. sodium chlorate in 200 ml. water and 2 ml. of an aqueous solution of osmium tetroxide (1 mmole/5 ml. water). After standing overnight at room temperature, this solution is combined with a similar one and shaken with a solution of 575 g. sodium sulfite in 2.5 liters of water. The mixture is extracted twice with methylene chloride and the extract washed with saturated brine. The organic phase is dried and concentrated. The residue is crystallized from ether to give 49.9 g. hemiketal, melting point 122°–136°C. as a mixture of stereoisomers. A second crop of crystals weighed 4.4 g.

Similar reaction with either the tetrahydropyranyl ether or t-butyl ether yield the corresponding hemiketal as oils.

EXAMPLE 13

Preparation of 5′α-Formylmethyl-3′,7′,8′,8′a-tetrahydro-5′β,8′aβ-dimethyl-spiro[1,3-dioxolane-2,1′(2′H)-naphthalen]-6′-(5′H)-one (VI R=ethylenedioxy)

To a solution containing 49.9 g. of the hemiketal (prepared in Example 12), in 480 ml. tetrahydrofuran is added with stirring and cooling 74.1 g. sodium metaperiodate in 480 ml. water. Stirring is continued overnight at room temperature. The mixture is then shaken with a solution containing 230 g. sodium sulfite and extracted with methylene chloride. The extract is washed with saturated brine, dried and evaporated. The residue is crystallized from ether-hexane to give 38.2 g. of the above aldehyde, melting point 61°–62.5° C. identical with the aldehyde prepared by ozonolysis of (III).

EXAMPLE 14

Preparation of 5′α-Formylmethyl-3′,7′,8′,8′a-tetrahydro-5′β,8′aβ-dimethylspiro[1,3,dioxolane-2,1′(2′H)-naphthalen]-6′(5′H)-one (VI R=ethylenedioxy)

In a gas wash bottle with fritted disc on the end of the inlet tube is placed 2.76 g. (0.01 mole) of allyl compound (prepared in Example 11) and 5.2 ml. pyridine and 36 ml. chloroform added. The solution is cooled to −20°C. and 1.3 equivalents of ozone passed into the solution. Excess ozone is then removed in a stream of nitrogen. Then a mixture of 5.48 ml. water, 5.45 ml. acetic acid and 10.76 ml. pyridine is added to the solution. While keeping the temperature of the solution below 0°, 3.28 g. zinc powder (which had been washed first with 2N acetic acid followed by water) is added in small portions with shaking and cooling during about 20 minutes. The mixture is filtered into a separatory funnel and diluted with benzene and water. The aqueous phase is reextracted with benzene. The combined organic phases are washed successively with water, saturated sodium bicarbonate, with 1.5 N phosphoric acid, saturated sodium bicarbonate and water. The benzene solution is dried and evaporated to leave the above aldehyde (2.0 g.).

EXAMPLE 15

Preparation of 2′,3′a,4′,5′,5′a,7′,8′,9′b-Octahydro-2′-(m-methoxy-phenyl)-5′aβ,9′bβ-dimethyl-spiro[1,3-dioxolane-2,6′-(1′H)naphtho-[2,1-b]turan]-3′a-ol (VII R=ethylene-dioxy and $R_1$=H)

All operations are carried out under dry nitrogen. To 1 g. of magnesium is added enough dry tetrahydrofuran to cover the metal. A few drops of dibromoethane is added to initiate the reaction. Then 5.61 g. (0.03 mole) m-bromoanisole is added at such a rate as to maintain a reaction mixture temperature of about 50°. The mixture was then stirred at 50° for a further 0.5 hour. The Grignard reagent is transferred to a dropping funnel using dry tetrahydrofuran to complete the transfer. Half of this solution is then added dropwise to the crude aldehyde (prepared in Example 14) in 40 ml. dry tetrahydrofuran. After the addition, the reaction mixture is stirred at room temperature for 1 hour. The excess reagent is destroyed by the addition of 40 ml. of a 2.5 M sodium dihydrogen phosphate and after stirring ro 10 minutes, the the mixture is diluted with ether and water. The ether extract is washed twice with water followed by saturated brine, dried and evaporated. The residue is crystallized from either to give in three crops 1.2 g. of the above hemiketal, melting point 148°–155° C.

EXAMPLE 16

Preparation of 3′,7′,8′,8′a-Tetrahydro-5′α-(m-methoryphenacyl)-5′β,8′aβ-dimethyl-7′-(N-methylanilinomethylene)-spiro[1,3-dioxo-lane-2,1′(2′H)-naphthalen]-6′(5′H)-one (VIII R=ethylenedioxy)

In a flask equipped with stirrer, condensor (with dry nitrogen inlet) and dropping funnel are placed 52.95 g. (0.15 mole) of 3′, ,4′,8′,8′a-tetrahydro-5′,8′a-dimethyl-7′-(N-methylanilinomethylene) -spiro[1,3-dioxolane-2,1′(2′H)naphthalen]-6′(7′H)-one (prepared in Example 8) in 600 ml. dry dimethoxyethane and 16.65 g. sodium hydride (54 percent suspension in mineral oil). The mixture is heated with stirring under reflux in a nitrogen atmosphere for two hours. This mixture is cooled and a solution of 51.45 g. (0.225 mole) of m-methoxyphenacyl bromide in about 500 ml. dry dimethoxyethane is added very slowly at room temperature. After the addition, the solution is stirred overnight at room temperature. Water is added to the solution and the reaction mixture poured into water, acidified with 2.5 M sodium dihydrogen phosphate and extracted with methylene chloride. The extract is washed with water, dried and evaporated. The residue is crystallized from acetone to give 45.3 g. (60 percent) of desired product, melting point 169.5°–170.5°C. Calcd. for $C_{31}H_{35}O_5N$: C, 74.23; H, 7.03; N, 2.79 Found: C, 74.39; H, 7.20; N, 2.36.

A similar experiment is run using the same quantities as above. The only modification made is that the phenacyl bromide is added to the reaction mixture at ice-bath temperature during 4.2 hours. The yield of product is 63.9 g. or 84.7 percent.

EXAMPLES 17 and 18

Preparation of 3',7',8',8'a-Tetrahydro-5'β-(methoxyphenacyl)5'β,-8'aβ-dimethyl-spiro[1,3-dioxolane-2,1'(2'H)-naphthalen]-6'(5'H)-one (X R=ethylenedioxy), and 3',7',8',8'a-Tetrahydro-7'-(hydroxy-methylene)-5'α-(m-methoxyphenacyl)-5'β,8'aβ-dimethyl, spiro[1,3-dioxolane-2,1'(2'H)naphthalen]-6'(5'H)-one (IX R=ethylenedioxy)

To a solution of 9.18 g. (0.183 mole) of the anilino compound (prepared in Example 16) in 610 ml. 2-ethoxyethanol is added 610 ml. water containing 258 g. potassium hydroxide. The mixture is heated at reflux under nitrogen for 6 hours and then cooled overnight. Two liters of water are added and the solution extracted with ether. The ether extract is successively washed with water, cold 2N hydrochloric acid and water. The extract is dried and the solvent evaporated. The residue (X, R=ethylenedioxy) on trituration with ether and recrystallization from acetone-hexane as melting point 121°–122°C. Calcd. for $C_{23}H_{28}O_5$: C, 71.85; H, 7.34 Found: C, 71.59; H, 7.34.

The aqueous phase from the first ether extraction above is acidified with ice-cold 2N hydrochloric acid and extracted with methylene chloride. The extract is washed with water and brine, dried and evaporated. The residue on trituration with ether at −5°C. and recrystallization from methanol gave the formyl compound, melting point 157°–160.5°C. (IX, R=ethylenedioxy). Calcd. for $C_{24}H_{28}O_6$: C, 69.88; H, 6.84 Found: C, 69.57; H, 6.89.

EXAMPLE 19

Preparation of 3',7',8',8'a-Tetrahydro-5'α-(m-methoxyphenethyl)-5'β,8'aβ-dimethyl-spiro[1,3-dioxolane-2,1'(2'H)-naphthalen]-6'-(5'H)-one (XI, R=ethylenedioxy)

A. A solution containing 10.0 g. (0.026 mole) of the diketone (X, R=ethylenedioxy) (Example 17) in 150 ml. glacial acetic acid is reduced with hydrogen at 70°C. in the presence of 1 g. 5 percent palladium-on-carbon. The initial pressure is 51.8 p.s.i. Reduction is complete in 3 hours. The solution is cooled, the catalyst removed by filtration and the solvent removed under reduced pressure. The residue (i.e., crude product [XI, R=ethylenedioxy]) is used directly for the preparation of the naphthalenedione (XV, R=ethylenedioxy, $R_2 = 0$).

B. A solution containing 4.5 g. of hemiketal (prepared in Example 15) in 50 ml. glacial acetic acid is reduced with hydrogen at 70° and 50 p.s.i. in the presence of 200 mg. 5 percent palladium-on-carbon. Reduction is complete in 3 hours. The catalyst is removed and the solvent evaporated to leave crude ketone (XI, R=ethylenedioxy) of sufficient purity for further transformations. C. Similarly, reduction of the corresponding t-butoxy or tetrahydropyranyloxy ethers (VII) yields the corresponding ketones (XI, R=t-butoxy and tetrahydropyranyloxy).

EXAMPLE 20

Preparation of 2',3'a,4',5',5'a,7'8',9'b-Octahydro-2'-(m-methoxy-phenyl)-5'aβ,9'bβ-dimethyl-spiro[1,3-dioxolane-2,6'(1'H)-naphtho-[2,1-b]furan]-3'a-ol (VII, E'=H) 2',3'a,4',5',5'a, 7,8',9'b-Octa-hydro-3'aζ-methoxy-2'-(m-methoxyphenyl)-5'aβ,9'bβ-dimethyl-spiro-[1,3-dioxolane-2,6'(1'H)-naphtho[2,1-b]furan] (VII, R'=CH₃) 1,2,-3a,4,5,5a,8,9b-Octahydro-3aζ-hydroxy-2-(m-methoxyphenyl)-5aβ,9bβ-dimethyl-naphtho[2,1-b]furan-6(7H)-one (XII)

A solution containing 10 g. of the diketone (prepared in Example 17) (X, R = ethylenedioxy) in 180 ml. methanol is reduced catalytically at 60°C. and an initial pressure of 50 p.s.i. in the presence of 1.0 g. 5 percent palladium-on-carbon. The reduction is complete in 2 hours. The mixture is cooled, and filtered and the solvent removed under reduced pressure. The residue is a mixture of hemiketal (VII, R' = H) and the mixed ketal (VII, R'=CH₃).

The crude reduction product is dissolved in a mixture of 108 ml. acetic acid and 36 ml. water and the solution heated on the steam bath for 1 hour. The reaction mixture is poured into water and extracted with ether. The extract is washed with water and saturated sodium bicarbonate solution. The ether is dried, the solvent evaporated and the residue crystallized from acetone-hexane to give product (XII), melting point 135.5°–138.5°C. Calcd. for $C_{21}H_{26}O_4$: C, 73.66, H, 7.66. Found: C, 73.60; H, 7.59.

By concentration of the mother liquors the second crystalline isomer, is obtained. Recrystallization of this material from acetone-hexane gives product, melting point 132.5°–133.5°C.

EXAMPLE 21

Preparation of 3,7,8,8a-Tetrahydro-5α-(β-hydroxy-m-methoxyphenethyl)-5β,8aβ-dimethyl-, 1,6(2H,5H)-naphthalenedione, acetate (XIII)

A solution containing 5.0 g. (0.0146 mole) of the hemiketal (XII) (prepared in Example 20) in 80 ml. acetic acid and 40 ml. acetic anhydride is heated under reflux for 1 hour. The solvents are then removed under reduced pressure, the residue dissolved in toluene and this also removed under reduced pressure. The residue compound (XIII) is used without further purification.

EXAMPLE 22

Preparation of 3,7,8,8a-Tetrahydro-5α-(m-methoxystyryl)-5β,8aβ-dimethyl-1,6(2H,5H)-naphthalenedione (XIV)

A solution containing 2.0 g. p-toluenesulfonic acid in 170 ml. benzene is heated under reflux under a Dean-Stark water separator filled with anhydrous calcium sulfate for 20 minutes. The crude acetate prepared in Example 21 in 40 ml. benzene is then added and refluxing continued for 1 hour. The solution is cooled, diluted with ether and washed with saturated sodium bicarbonate. The organic phase is dried and evaporated. The residue is crystallized from methanol to give 1.8 g. product (XIV). Recrystallization of this material from methanol gives 1.5 g., melting point 91°–92°C. Calcd. for $C_{21}H_{24}O_3$: C, 77.75; H, 7.46. Found: C, 77.57; H, 7.51.

EXAMPLE 23

Preparation of 3,7,8,8a-Tetrahydro-5α-(m-methoxyphenyl)-5β,8aβ-dimethyl-1,6(2H,5H)-naphthalenedione (XV, $R_2$=0)

The crude product (XI) prepared in Example 19 above is heated on the steam-bath with 20 ml. water and enough acetic acid to give a homogeneous solution for 1 hour. After standing at room temperature overnight, the solution is diluted with water and extracted with ether. The ether extract is washed with water and then saturated sodium bicarbonate solution. The extract is dried and the solvent removed. The residue crystallized from methanol to give 5.0 g. product (XV, $R_2$ = 0), melting point 68°–70°C.

EXAMPLE 24

Preparation of 3,7,8,8a-Tetrahydro-5α-(m-methoxyphenyl)-5β,8aβ-dimethyl-1,6(2H,5H)-naphthalenedione (XV, $R_2$=0)

A solution containing 324 mg. (1 mmole) of compound (XIV) (prepared in Example 22) in 15 ml. ethanol is reduced catalytically at room temperature and atmospheric pressure in the presence of 50 mg. 5 percent palladium-on-carbon. The catalyst is removed by filtration and the solvent removed under reduced pressure. After standing for sometime, the product crystallizes. Crystallization from a mixture of ether and hexane gives product, (XV, $R_2$ = 0), melting point 69°–71°C. Calcd. for $C_{21}H_{26}O_3$; C, 77.27; H, 8.03 Found: C, 77.39; H, 7.93.

EXAMPLE 25

Preparation of 1,2,3a,4,5,5a,6,7,8,9b-Decahydro-2-(methoxyphenyl)-5aβ,9bβ-dimethyl, naphtho[2,1-b]furan-3aζ,6β-diol (XVI)

To a solution containing 5.0 g. (0.015 mole) ketone (XII) (prepared in Example 20) in 100 ml. absolute ethanol is added 2.0 g. sodium borohydride. The reaction is allowed to proceed to room temperature with intermittent swirling for 15 minutes. The mixture is then poured into water and extracted with ether. The ether extract is washed with water, saturated brine, dried and evaporated. The residue is crystallized from acetone-hexane to give product compound (XVI), melting point 141°–148°C. Calcd. for $C_{21}H_{28}O_4$: C, 73.22; H, 8.19. Found: C, 73.05; H, 8.13.

EXAMPLE 26

Preparation of 3,4,4a,5,6,7-Hexahydro-5β-hydroxy-1α-(methoxyphen-yl)-1β,4aβ-dimethyl-2(1H)-naphthalenone (XVII)

A solution containing 688 mgs. of the hemiketal (prepared in Example 25) in 18 ml. glacial acetic acid is reduced with hydrogen at 45 p.s.i. and 70° in the presence of 100 mgs. 5 percent palladium-on-carbon. The reduction is complete in 2 hours when the mixture is cooled, the catalyst removed and the solvent evaporated under reduced pressure. The material (XV, $R_2$ = OH or XVII) is of sufficient purity for conversion by oxidation to compound (XV, $R_2$ = 0) or reduction to compound (XVIII).

EXAMPLE 27

Preparation of 3,4,4a,5,6,7-Hexahydro-5β-hydroxy-1α-(m-methoxyphenethyl)-1β,4aβ-dimethyl-2(1H)-naphthalenone (XVII)

A. To a solution containing 1.63 g. of the enedione (prepared in Example 23) in 25 ml. 95 percent ethanol is added with stirring 0.5 g. sodium borohydride. Stirring is continued for 15 minutes and the mixture then diluted with a large volume of water. The solution is extracted with ether, the extract washed with water, dried and evaporated. The residue compound (XVII), an oil, is used without further purification.

B. A solution containing 688 mgs. of the hemiketal (prepared in Example 25) in 18 ml. acetic acid is hydrogenated at 70°C. and 50 p.s.i. After three hours the catalyst is removed and the solvent evaporated to give a residue identical to that described above compound (XVII).

EXAMPLE 28

Preparation of 3,4,4a,5,6,7,8,8aα-Octahydro-5β-hydroxy-1α(m-methoxyphenethyl)-1β,4aβ-dimethyl-2(1H)-naphthalenone (XVIII)

A solution containing 1.38 g. of crude unsaturated keto alcohol (XVII) prepared as in Example 27 in 20 ml. ethanol is reduced at 70°C. with hydrogen in the presence of 200 mg. 5 percent palladium-on-carbon. After 20 hours, the catalyst is removed and the solvent evaporated. The residue containing the above named product (XVIII) is used without further purification.

EXAMPLE 29

Preparation of 3,4,4aα,7,8,8a-Hexahydro-5α-(m-methoxyphenethyl)-5β,8aβ-dimethyl-1,6(2H,5H)-naphthalenedione (XIX)

The crude keto alcohol (XVIII) prepared in Example 28 is dissolved in 20 ml. acetone and cooled to 0°. Jones' reagent is then added dropwise with stirring until a permanent brown color is obtained. The solution is stirred for 15 minutes at room temperature and then poured into water and extracted with ether. The extract is washed with water, dried and evaporated. The residue is crystallized from ether-hexane to give 640 mg. trans-dione, (XIX), melting point 86°–88.5°C.

EXAMPLE 30

Preparation of 3-Methoxy-8β-methyl-D-homoestra-1,3,5(10),9(11)-tetraen-17a-one (XX)

To 328 mgs. of the trans-dione (XIX) (prepared in Example 29) in 6 ml. ethanol is added 3 ml. concentrated hydro-chloric acid and the solution refluxed for 20 minutes. The mixture is diluted with water and extracted with water, dried and evaporated. The residue is crystallized from acetonitrile to give the product (XX), melting point 150.5°–152.5°C.

EXAMPLE 31

Preparation of 17-(hydroxymethylene)-3-methoxy-8β-methyl-D-homo-estra-1,3,5(10),9(11)-tetraen-17a-one (XXI, R₃=CH₃)

To a stirred suspension of 48.6 g. sodium methoxide in 690 ml. dry benzene under nitrogen is added 130 ml. ethyl formate in a stream. After stirring at room temperature for 1 hour, the mixture is cooled in an ice-water bath and 50 g. (0.16 mole) of ketone in 570 ml. dry benzene is added during 1 hour. The reaction mixture is stirred at room temperature overnight. After cooling, the mixture is acidified with dilute hydrochloric acid and methylene chloride added. After shaking, the organic phase is separated, washed with water, dried and evaporated. The residue is triturated with ether and the crystalline solid removed by filtration. The solid has a melting point 180°–182°C. Anal. Calcd. for C₂₂H₂₆O₃: C, 78.07; H, 7.74. Found C, 78.34; H, 7.76.

Substituting 3-ethoxy-8β-methyl-D-homoestra-1,3,5(10), 9(11)-tetraen-17a-one for the 3-methoxy homologue employed in the above procedure yields 17-(hydroxymethylene)-3-ethoxy-8β-methyl-D-homoestra-1,3,5(10),9(11)-tetraen-17a-one. (XXI, R₃=C₂H₅).

EXAMPLE 32

Preparation of 17-diazo-3-methoxy-8β-methyl-D-homoestra-1,3,5-(10,9(11)-tetraen-17a-one (XXII, R₃=CH₃)

To a solution of 52.3 g. (0.155 mole) of the hydroxymethylene compound (Example 31) in 770 ml. dry tetrahydrofuran is added 30.4 g. (0.155 mole) tosyl azide followed by 22.6 g. of dry diethylamine. After stirring for 2.5 hours the solution is poured into water and extracted with methylene chloride. The extract is washed with water, dried and evaporated. The residue is triturated with ether and the crystalline solid removed to give 49.6 g. (98.1 percent) diazoketone, which is recrystallized from nitromethane followed by ethylene chloride to give a solid sample, melting point 123°C.

Anal. Calcd. for C₂₁H₂₄N₂O₂: C, 74.97; H, 7.19; N, 8.33. Found: C, 75.08; H, 7.24; N, 8.48.

When 17-(hydroxymethylene)-3-ethoxy-8β-methyl-D-homoestra-1,3,5(10),9(11)-tetren-17a-one (XXI, R₃=C₂ₐH₅) is substituted for the 3-methoxyhomologue in the above process 17-diazo-3-ethoxy-8β-methyl-D-homoestra-1,3,5(10),9(11)-tetraen-17a-one (XXII, R₃=C₂ₐH₅) is obtained. Similarly, substituting the 3-propoxy or 3-butoxy homologue of the hydroxymethylene compound (XXI) yields the corresponding 3-propoxy or 3-butoxy diazoketone.

EXAMPLE 33

Preparation of 3-Methoxy-8β-methyl-estra-1,3,5(10),9(11)-tetraene-17β-carboxylic acid, methyl ester (XXIII, R₃=CH₃)

A solution containing 12.4 g. diazoketone (Example 32) in 350 ml. dry tetrahydrofuran and 550 ml. dry methanol are photolyzed for 3 hours by means of a 450 watt Hanovia high-pressure quartz mercury-vapor lamp using a corex filter. The solutions from the photolyzes of four runs using a total of 49.6 g. of diazoketone are combined and the solvents removed. The residue is triturated with ether to give 37.1 g. of the ester, melting point 149°–152°C. Evaporation of the mother liquors gives 15.4 g. of residue which is dissolved in 250 ml. dry benzene and 1.5 g. p-toluene-sulfonic acid. The mixture is refluxed under a Deam-Stark water separator for 0.5 hours. The cooled solution is washed with water, saturated sodium bicarbonate solution, dried and evaporated. The residue is triturated with ether to give a further 1.9 g. of ester which is recrystallized from acetone-hexane to give material with melting point 153°–155°C.

Anal. Calcd. for C₂₂H₂₈O₃: C, 77.61; H, 8.29. Found: C, 77.1; H, 8.38.

Use of 17-diazo-3-ethoxy-8β-methyl-D-homoestra-1,3,5-(10),9(11), tetraen-17a-one (XXII, R₃=C₂H₅) in place of the 3-methoxy homologue in the above procedure gives the 3-ethoxy-8β-methyl-estra-1,3,5(10),9(11)-tetraene-17β-carboxylic acid methyl ester; and when the same reaction is run in ethanol, propanol or butanol, the corresponding ethyl, propyl or butyl ester is obtained.

EXAMPLE 34

Preparation of 3-Methoxy-8β-methyl-estra-1,3,5(10),9(11)-tetra-ene-17β-carboxylic acid (XXIV, R₃=CH₃ᵦ)

A. To a solution containing 3.4 g. (10 mmole) ester (Ex-ample 33) in 70 ml. 95 percent ethanol is added 5 ml. 5N potassium hydroxide and 10 ml. water. After refluxing for 2 hours, the mixture is diluted with water and acidified with concentrated hydrochloric acid. The precipitate is filtered, washed with water and air dried. Yield 3.15 g. A portion is crystallized from acetic acid followed by acetonitrile to give a sample, melting point 242°–246.5°C. Anal. Calcd. for C₂₁H₂₆O₃: C, 77.27; H, 8.03. Found: C, 77.04; H, 7.95.

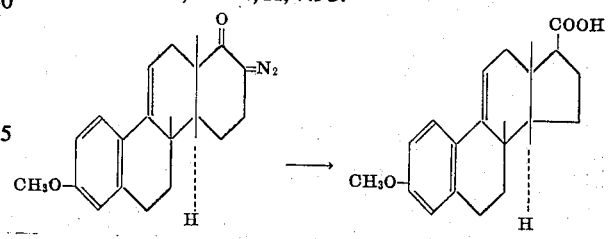

B. A solution containing 336 mgs. (1 mmole) diazoketone (Example 32) in 25 ml. tetrahydrofuran and 15 ml. water is photolyzed as described above for the preparation of the methyl ester. After 45 minutes, the solution is diluted with water and extracted with ether. The extract is dried and evaporated and the residue crystallized from acetone-hexane to give 211 mgs. of acid, identical to that prepared by the immediately above procedure.

Substitution of the 3-ethoxy, 3-propoxy or 3-butoxy ester from Example 33, for the 3-methoxy methyl ester used in the above procedure, yields the corresponding 3-ethoxy, 3-propoxy or 3-butoxy-8β-methyl-estra-1,3,5(10),9(11)-tetraene-17β-carboxylic acid.

EXAMPLE 35

Preparation of 3-Methoxy-8β-methyl-17β-[(methylsulfinyl)acetyl]-estra-1,3,5(10),9(11)-tetraene (XXV, $R_3=CH_3$, A three-necked flask equipped with stirrer, dropping funnel and condensor with nitrogen inlet is purged with dry nitrogen. Then, 11.2 g. of a 54 percent suspension of sodium hydride in mineral oil is added and the mineral oil washed with n-pentane. After adding 310 ml. dry dimethyl sulfoxide the mixture is stirred at 70°C. until all the hydride has reacted (2 hours). To the mixture at room temperature is added 15.6 g. of the ester (Example 33) in 120 ml. dry tetrahydrofuran dropwise and stirring continued for 2 hours. The solution is poured into water, acidified to pH 3–4 with dilute hydrochloric acid and extracted twice with methylene chloride. The organic phase is washed three times with water, dried and evaporated. The residue is crystallized from acetonitrile to give 11.1 g. product, melting point 149°–153°C. A second crop is obtained by evaporation of the mother liquors and crystallizing the residue from acetone-hexane weight, 4.3 g., melting point 127°–128°C.

The high and low melting products have different Nujol mull infrared spectra. The solution spectra, however, (in arsenic trichloride) are identical in NMR spectra and show some intensity differences. Both products on reduction with aluminum amalgam give the same methyl ketone described below. The compounds are stereo isomers. Anal. Calcd. for $C_{23}H_{30}SO_3$: C, 71.46; H, 7.82; S, 8.30. Found: C, 71.37; H, 7.88; S, 8.42.

Use of 3-ethoxy-8β-methyl-estra-1,3,5(10),9(11)-tetraene-17β-carboxylic acid, methyl ester (XXIII, $R_3 = C_2H_5$) in the above procedure yields 3-ethoxy-8β-methyl-17β-[(methylsulfinyl)-acetyl]-estra-1,3,5(10),9(11)-tetraene (XXV, $R_3=C_2H_5$).

EXAMPLE 36

Preparation of 3-Methoxy-8β-methyl-19-norpregna-1,3,5(10,9(11)-tetraen-20-one (XXVI, $R_3=CH_3$)

To a solution containing 14.1 g. of β-ketosulfoxide (Example 35) in 900 ml. of a 10 percent water-tetrahydrofuran mixture is added 12.3 g. aluminum foil freshly amalgamated in 2 percent mercuric chloride. The mixture is stirred at 55°–60°C. for 90 minutes. After cooling, the mixture is filtered through filter aid and the filtrate evaporated. The residue is partitioned between methylene chloride and water, the organic phase separated and washed with water, saturated brine, dried and evaporated. Trituration with ether gives a crude solid which is collected. Small quantities of sulfur-containing impurities are in this product which completely poisons the catalyst when hydrogenation of the product is attempted. For this reason the crude product is treated with deactivated Raney nickel as follows:

Raney nickel is washed thoroughly with water then 1 percent acetic acid solution and finally with absolute ethanol. The nickel wet with ethanol is transferred to a three-necked flask with 800 ml. acetone and the mixture refluxed with stirring for 2 hours. The crude product dissolved in 750 ml. acetone is added and heating and stirring continued for 3 hours. After cooling, the catalyst is removed by filtration and the filtrate evaporated. The residue on trituration with ether gives a product which on recrystallizing from acetone-hexane followed by benzene-hexane, yields the desired product, melting point 140°–141°C. Anal. Calcd. for $C_{22}H_{28}O_2$ C, 81.44; H, 8.70. Found C, 81.27; H, 8.70.

The same product is obtained when the β-ketosulfoxide is reduced with zinc in acetic acid. Substitution of 3-ethoxy or 3-propoxy β-ketosulfoxide for the 3-methoxy β-ketosulfoxide used in the above synthesis yields the corresponding 3-ethoxy or 3-propoxy-8β-methyl-19-norpregna-1,3,5(10),9(11)-tetraen-20-one.

EXAMPLE 37

Preparation of 3-Methoxy-8β-methyl-19-nor-9ζ-pregna-1,3,5(10)-trien-20-one (XXVII, $R_3=CH_3$)

A solution containing 15.0 g. of the tetraen (Example 36) in 500 ml. acetic acid is reduced with hydrogen at room temperature and atmospheric pressure in the presence of 1.2 g. of 5 percent palladium-on-carbon. One equivalent of hydrogen is absorbed in 5 hours. The residue is dissolved in toluene and the toluene evaporated. Crystallization of the residue from acetone-hexane gives 11.9 g. product, which on recrystallization yields product, melting point 143.5°–145°C. Anal. Calcd. For $C_{22}H_{30}O_2$: C, 80.93; H, 9.26. Found C, 80.79; H, 9.16.

When the 3-ethoxy or 3-propoxy tetraen is substituted for the 3-methoxy tetraen employed above, the corresponding 3-ethoxy or 3-propoxy-8β-methyl-9-nor-9ζpregna-1,3,5(10)-trien-20-one is obtained.

EXAMPLE 38

Preparation of 3-Methoxy-8β-methyl-17β-(2-methyl-1,3-dioxolan-2-yl)-9ζ-estra-1,3,5(10)-triene (XXVIII, $R_3=CH_3$)

To a solution containing 2.0 g. of the ketone (Example 37) in 75 ml. benzene is added 1.5 ml. ethylene glycol and 250 mg. p-toluenesulfonic acid. The solution is heated under reflux under a Dean-Stark water separator for 5 hours. The mixture is cooled, diluted with ether and washed with saturated sodium bicarbonate solution. The organic phase is then washed twice with water, dried and evaporated. The residue is essentially a quantitative yield of crystalline ketal, and is used directly for the lithium-ammonia reduction.

The ketal can be recrystallized from nitromethane to give product, melting point 133°–134°C. Anal. Calcd. for $C_{24}H_{34}O_3$: C, 77.80; H, 9.25. Found: C, 78.16; H, 9.43.

Substitution in the above synthesis of the 3-ethoxy ketone or 3-propoxy ketone for the 3-methoxy ketone yields the corresponding 3-ethoxy or 3-propoxy-8β-methyl-17β-(2-methyl-1,3-dioxolan-2-yl)-9ζ-estra-1,3,5(10)-triene.

EXAMPLE 39

Preparation of 8β-methyl-19-nor-9ζ-10ζ-pregn-4-ene-3,2o-dione (XXX)

Into a solution of 7.8 g. of the ketal (Example 38) in 680 ml. dry tetrahydrofuran is distilled 1 liter of anhydrous ammonia. The solution is stirred under a dry ice condenser protected from water vapor by a calcium chloride drying tube. To the solution is added 9.8 g. lithium wire cut into small pieces. After stirring for 2.5 hours, absolute ethanol is added dropwise to discharge the blue color (3.5 hours). The ammonia is allowed to evaporate overnight. The mixture is cooled to 0°C. and water cautiously added. The aqueous solution is extracted with ether and the extract washed with water and brine, dried and evaporated. The residue is a solid consisting mostly of the dihydrobenzene.

The crude product in 100 ml. methanol and 20 ml. 2N hydrochloric acid is refluxed for 30 minutes. The solvent is then evaporated and the residue distributed between methylene chloride and water. The organic phase is washed with water, dried and evaporated. The residue is triturated with hexane-ether to give 3.98 g. of crude product, which is recrystallized from acetonitrile to give 3.1 g. material, melting point 166°–168°C. Anal. Calcd. for $C_{21}H_{30}O_2$: C, 80.21; H, 9.62; Found: C, 80.56; H, 9.85.

EXAMPLE 40

Test for estrogenic activity

Immature female Wistar origin rats are 19 to 21 days of age and are employed as the test animal to determine estrogen-ic activity of candidate compounds. Test compounds are given by subcutaneous injections once daily for three successive days in 0.2 ml. of injection vehicle. This injection vehicle is:

| | |
|---|---|
| 0.5 gm. | carboxymethylcellulose (low viscosity) |
| 0.4 gm. | Tween 80 |
| 0.9 gm. | sodium chloride |
| 10.0 ml. | polyethylene glycol (Carbowax 300) |
| 90.0 ml. | distilled water |

Twenty-four hours after the third injection the rats are sacrificed, the uteri removed and disected free from the ovaries, oviducts, and mesentery. Each uterine horn is split longitudinally and the uterine fluid bottled dry. The uteri are weighed to the nearest milligram on a balance. Ten rats are used for each treatment. Increased uterine weight over the control (untreated) uteri indicates estrogenic activity. All animals receive a commercial laboratory animal ration ad libitum and fresh water is available at all times while on test. The following table summarizes the estrogenic activity of the present compounds.

TABLE

| Compound | Effective dose |
|---|---|
| 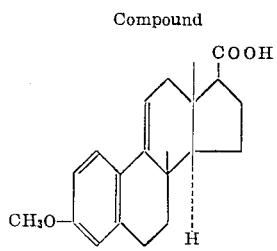 (XXIV, $R_3$=CH$_3$) | 0.5 mg./rat/day |
| 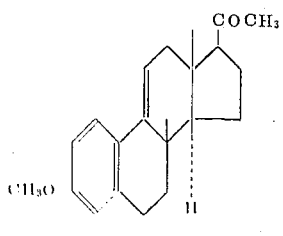 (XXVI, $R_3$=CH$_3$) | 0.5 mg./rat/day |

EXAMPLE 41

ANTIOVULATORY TEST

Adult female rats of Wistar origin weighing approximately 170 to 180 grams each are used as the test animal. Starting on the day of vaginal estrus, test compounds are given by subcutaneous injections once daily for five successive days in 1 ml. of injection vehicle. The injection vehicle is:

| | |
|---|---|
| 0.5 gm. | carboxymethylcellulose (low viscosity) |
| 0.4 gm. | Tween 80 |
| 0.9 gm. | sodium chloride |
| 10.0 ml. | polyethylene glycol (Carbowax) |
| 90.0 ml. | distilled water |

Twenty-four hours after the last injection of test compound the rats are sacrificed and the uteri, oviducts and ovaries are removed. The oviducts and a small segment of the uterine horn are separated from the remainder of the uterine horn and ovaries. These oviducts are then flushed with physiological saline to determine if ova are present. A compound is considered to be antiovulatory if none of six treated female rats ovulate (have ova in the oviducts). All animals received a commercial laboratory animal ration ad libitum and fresh water is available at all times while on test. The following Table I summarizes antiovulatory testing data.

TABLE

| Compound | Effective dose |
|---|---|
| 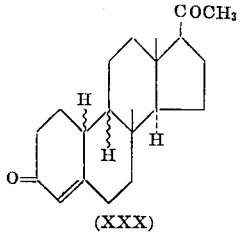 (XXX) | 1 mg./rat/day |

EXAMPLE 42

Use of 8β-Methyl-19-nor-9ζ-10ζ-pregn-4-ene-3,20-dione (XXX) in Estrous Regulation in Sheep Purpose: To determine whether or not 8β-methyl-19-nor-9ζ-10ζ-pregn-4-ene-3,20-dione will alter the estrous cycle of sheep.

Animals: Mature, Suffolk ewes wieghing from 80 to 100 kg., were checked twice daily for signs of heat using rams wearing aprons to prevent copulation. After at least one complete cycle the ewes were placed on test.

Diet: All ewes were given good quality alfalfa hay, minerals and water free choice.

Treatment: All treatments were administered daily by subcutaneous injection for 10 days beginning five days prior to the next expected heat. A ewe was considered "blocked" if she failed to show signs of heat during the injection period and her subsequent estrous cycles were not in phase with those prior to treatment.

Vehicle: All treatments were administered in 5 cc. of a vehicle containing 0.9 percent sodium chloride, 0.5 percent carboxymethyl cellulose, 0.4 percent Tween 80 and 10 percent carbowax 300.

Results: Both 8β-methyl-19-nor-9ζ-10ζ-pregn-4-ene-3,20-dione and progesterone were injected at 10, 5, 2.5 and 1.25 mg. per ewe per day for 10 days. Both compounds were 100 percent effective at the 10 mg. level. At the 5 mg. level, progesterone blocked four out of six and 8β-methyl-19-nor-9ζ-10ζ-pregn-4-ene-3,20-dione five out of six ewews tested. Both were without effect at the 2.5 mg. level.

I claim:

1. The compound 17-diazo-3-methoxy-8β-methyl-D-homoestra-1,3,5(10),9(11)-tetraen-17a-one.

2. A compound 3-methoxy-8β-methylestra-1,3,5(10),9(11)-tetraene-17β-carboxylic acid, lower alkyl ester.

3. The compound 3-methoxy-8β-methyl-17β-[(methylsulfinyl)acetyl]-estra-1,3,5(10),9(11)-tetraene.

4. The compound 3-methoxy-8β-methylestra-1,3,5(10),9(11)-tetraene-17β-carboxylic acid.

* * * * *